Nov. 10, 1964 E. G. GRIFFITHS 3,156,493
PUSH BUTTON FASTENER
Filed Oct. 21, 1960
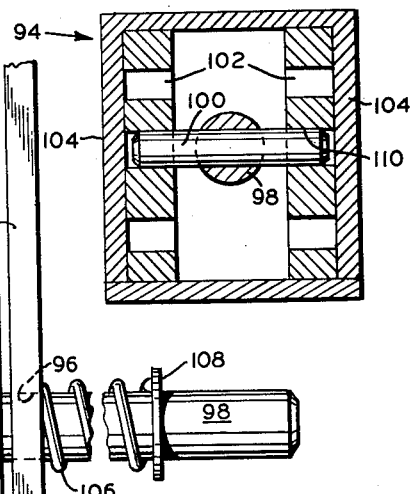
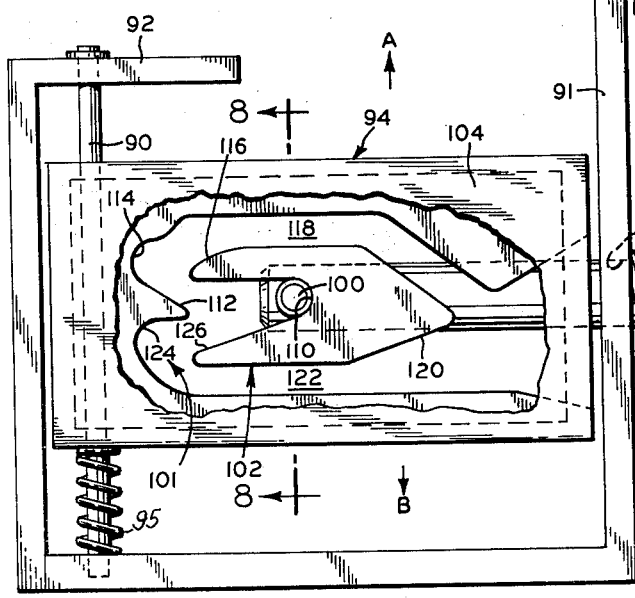
INVENTOR.
EDWARD G. GRIFFITHS
BY John P. Chandler
HIS ATTORNEY.

United States Patent Office 3,156,493
Patented Nov. 10, 1964

3,156,493
PUSH BUTTON FASTENER
Edward G. Griffiths, Maywood, N.J., assignor to Camloc Fastener Corporation, Paramus, N.J., a corporation of New York
Filed Oct. 21, 1960, Ser. No. 64,047
5 Claims. (Cl. 292—164)

This invention relates to fastening devices and in particular a push button fastener of novel design wherein the button is pushed to lock the fastener within a specially formed receptacle and then pushed again to unlock it. While the invention lends itself to a wide range of applications, it is especially suitable for panels and doors where fast access is desirable.

Fasteners heretofore have generally been designed in such manner that the handle or knob must be actuated in one direction for locking and in another direction for unlocking. Furthermore, it is necessary to firmly grip the operating member in order to lock or unlock the fastener. The present invention, however, is locked by merely pushing a button and unlocked by pushing the same button in the same manner.

It is an object of the present invention therefore to provide an improved fastening device which eliminates the necessity of grasping the operating member.

Another object is to provide a fastener which is operated by one push button and requiring the same movement to unlock as is required to lock the device.

In most instances the push button element is a headed stud or plunger passing through an opening in a member or panel to be removably mounted on a fixed structure on which the receptacle is carried, but in other installations, such as a cabinet door, the outer end of the stud is provided with a screw thread which is simply screwed into the door from the inside and therefore is not seen when the door is in closed position. Thus when the door is pushed to closed position the stud becomes locked within the receptacle and when it is pushed again it is free to open. In such an arrangement the door itself becomes the push button element.

Another object of the invention is to provide a sequentially operated push button fastener, i.e., one pushing motion to lock and a similar pushing motion to release, wherein both the locking and unlocking actions are positive, and failure of the unlocking action is a virtual impossibility, and this certainty of operation is not affected if the grip thickness is changed. This latter feature is particularly important for in many push button fasteners in the past an increase or a decrease in thickness of the removable panel would probably not prevent effective locking action but release could not be achieved.

The push button fastener of the present invention is particularly useful in places which are difficult of access since nothing need be grasped to secure the locking action.

In the drawing:

FIG. 1 is a side elevation, partly in section, of a typical installation in locked position.

FIG. 2 is a section taken on line 2—2 of FIG. 1.

A guide rod 90 is supported in a frame 92 and forms a movable support for a housing 94. A projecting arm 91 of the frame 90 is provided with an opening 96 to slidably receive a plunger 98 which is movable into housing 94. This housing would generally be carried by a fixed structure while plunger 98 is used to secure a movable member to the fixed structure. A crosspin 100 is secured in the end of the plunger 98 to cooperate with cam elements 101 and 102 which are attached upon opposed vertical sides 104 of the housing 94 by any suitable means such as welding or bonding. A compressive spring 106 is positioned between the frame section 91 and a retaining washer 108 mounted upon the free end of the rod 98 and serves to hold the crosspin 100 in locked position in a detent 110 in cam element 102. The cam surfaces have contours substantially similar to those earlier described except that they are not circular.

To unlock the device, the rod 98 is pushed inwardly compressing the spring 106 and moving the crosspin 100 to position against an inclined cam surface 112 which moves the housing, thence into a limiting detent 114. The rod is then released and the spring 106 carries the rod outwardly so that the crosspin passes over an inclined cam surface 116 again moving the housing 94 along the guide rod 90 so that the crosspin enters a passageway 118 from whence it moves outwardly into unlocked position. To lock the device the rod 98 is again pushed inwardly causing the crosspin 100 to strike the inclined surface 120 thereby moving the housing 94 along the guide rod in the direction of the arrow A and allowing the crosspin 100 to pass through passageway 122 into a limiting detent 124. The rod 98 is then released moving outwardly by force of the spring 106 to strike an inclined cam surface 126 thereby moving the housing 94 along the guide rod in the direction of the arrow B until the crosspin 100 reaches locked position in the detent 110.

While there have been described herein what are at present considered a preferred embodiment of the invention, it will be obvious to those skilled in the art that many modifications and changes may be made therein without departing from the essence of the invention. It is therefore to be understood that the exemplary embodiment is illustrative and not restrictive of the invention, the scope of which is defined in the appended claims, and that all modifications that come within the meaning and range of equivalency of the claims are intended to be included therein.

What I claim is:

1. An assembly for holding a pair of members in assembled relationship including in combination a pair of elements comprising interengageable means for holding said members in assembled relationship, means mounting said elements respectively on said members for relative rectilinear movement therebetween along an axis and for relative rectilinear movement therebetween in a direction perpendicular to said axis, means responsive to a first rectilinear movement of said elements along said axis in one direction for producing relative movement in a second direction perpendicular to said axis, means responsive to said relative movement in said second direction for engaging said interengageable means to hold said members assembled, means responsive to a second relative rectilinear movement of said elements in said one direction for producing a second relative rectilinear movement of said elements in said second direction perpendicular to said axis and means responsive to said second relative movement in said second direction for releasing said interengageable means to free said members.

2. An assembly for holding a pair of members in assembled relationship including in combination a pair of elements comprising interengageable means for holding said members in assembled relationship, means mounting said elements on said members for relative rectilinear movement along an axis and for relative rectilinear movement in a direction perpendicular to said axis, means normally urging said elements away from each other, means responsive to a first rectilinear movement of said elements relative to each other in one direction along said axis for producing a relative rectilinear movement of said elements in a second direction perpendicular to said axis, means responsive to said movement in said second direction for engaging said interengageable means to hold said members assembled, means responsive to a second relative rectilinear movement of said elements in said one direction along said axis against the action of said resilient means for producng a second relative rectilinear movement of said elements in said second direction perpendicular to said axis and means responsive to said second movement in said second direction for disengaging said interengageable means to free said members.

3. An assembly for holding a pair of members in assembled relationship including in combination a fastener provided with a crosspin, means mounting said fastener on one of said members for rectilinear movement along an axis, a receptacle providing a detent for receiving said crosspin, means mounting said receptacle for rectilinear movement on the other member in a direction perpendicular to said axis, first interengageable means comprising said crosspin and responsive to a first rectilinear movement of said fastener in one direction along said axis for bringing said pin into engagement with said detent to hold said members assembled and second interengageable means comprising said crosspin and responsive to a second rectilinear movement of said fastener in said one direction along said axis for freeing said members.

4. An assembly for holding a pair of members in assembled relationship including in combination a fastener provided with a crosspin, means mounting said fastener on one of said members for rectilinear movement along an axis, a receptacle providing a detent for receiving said crosspin, means mounting said receptacle for rectilinear movement on the other member in a direction perpendicular to said axis, means comprising a first track and a first cam surface responsive to a first rectilinear movement of said fastener in one direction along said axis for bringing said crosspin into engagement with said detent to hold said members assembled, and second means comprising a second cam surface and a second track responsive to a second rectilinear movement of said fastener in said one direction along said axis for freeing said members.

5. An assembly for holding a pair of members in assembled relationship including in combination a fastener provided with a crosspin, means mounting said fastener on one of said members for rectilinear movement along an axis, a receptacle providing a detent for receiving said crosspin, means mounting said receptacle for rectilinear movement on the other member in a direction perpendicular to said axis, resilient means for urging said fastener and said receptacle away from each other, means comprising a first track and a first cam surface responsive to movement of said fastener in one direction along said axis against the action of said resilient means for guiding said pin into said detent to hold said members assembled and second means comprising a second cam surface and a second track responsive to movement of said fastener in said one direction along said axis for guiding said pin out of said detent to free said members.

References Cited in the file of this patent

UNITED STATES PATENTS

| | | |
|---|---|---|
| 1,509,780 | Robertson | Sept. 23, 1924 |
| 1,792,537 | Irwin | Feb. 17, 1931 |
| 2,497,425 | Terry | Feb. 14, 1950 |
| 2,535,639 | Lauer | Dec. 26, 1950 |
| 2,548,046 | Nottingham | Apr. 10, 1951 |
| 2,817,554 | Hasselmark | Dec. 24, 1957 |
| 2,844,401 | Kaufman | July 22, 1958 |